(12) United States Patent
Masone et al.

(10) Patent No.: US 8,544,072 B1
(45) Date of Patent: Sep. 24, 2013

(54) SINGLE SIGN-ON SERVICE

(75) Inventors: Christopher Masone, Burlingame, CA (US); Kan Liu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 318 days.

(21) Appl. No.: 12/828,026

(22) Filed: Jun. 30, 2010

Related U.S. Application Data

(60) Provisional application No. 61/251,292, filed on Oct. 13, 2009, provisional application No. 61/251,293, filed on Oct. 13, 2009.

(51) Int. Cl.
*H04L 29/00* (2006.01)

(52) U.S. Cl.
USPC ............. 726/6; 726/2; 726/3; 726/4; 726/5; 726/7; 726/8; 726/9; 726/10

(58) Field of Classification Search
USPC ..................................... 726/2–10
See application file for complete search history.

(56) References Cited

U.S. PATENT DOCUMENTS

| | | | |
|---|---|---|---|
| 7,512,799 B1 | 3/2009 | Chow et al. | |
| 7,530,094 B2 | 5/2009 | Philips et al. | |
| 7,530,099 B2 | 5/2009 | Flurry et al. | |
| 7,540,020 B1 | 5/2009 | Biswas et al. | |
| 7,540,022 B2 | 5/2009 | Barari et al. | |
| 7,562,221 B2 | 7/2009 | Nystrom et al. | |
| 7,571,473 B1 | 8/2009 | Boydstun et al. | |
| 7,571,489 B2 | 8/2009 | Ong et al. | |
| 7,596,804 B2 | 9/2009 | Toomey et al. | |
| 7,603,555 B2 | 10/2009 | Schmidt et al. | |
| 7,610,390 B2 | 10/2009 | Yared et al. | |
| 7,613,919 B2 | 11/2009 | Bagley | |
| 7,620,978 B1 | 11/2009 | Reddy et al. | |
| 7,627,751 B2 | 12/2009 | Ikenoya | |
| 7,631,346 B2 | 12/2009 | Hinton et al. | |
| 2003/0182551 A1* | 9/2003 | Frantz et al. | 713/170 |
| 2003/0188193 A1* | 10/2003 | Venkataramappa | 713/201 |
| 2005/0198534 A1* | 9/2005 | Matta et al. | 713/201 |
| 2006/0041933 A1 | 2/2006 | Yakov et al. | |
| 2007/0118889 A1* | 5/2007 | Fredell | 726/5 |
| 2007/0226783 A1 | 9/2007 | Mimlitsch | |
| 2008/0239357 A1* | 10/2008 | Matsushima | 358/1.13 |

FOREIGN PATENT DOCUMENTS

WO 2011046939 A1 4/2011

OTHER PUBLICATIONS

PCT Search Report for PCT Application No. PCT/US2010/052333, mailed Feb. 9, 2011, 12 pages.
"Crypt (Unix)", Wikipedia, the free encyclopedia, Sep. 16, 2009, 5 pages.
"Login Authentication Using Active Directory", VMWare Techinical Note, ESX Server 2.1, Jan. 1, 2006, 7 pages.
"MD5", Wikipedia, the free encyclopedia, Oct. 8, 2009, 7 pages.
Neuman, et al, "The Kerberos Network Authentication Service (V5); rfc4120.tx", Network Working Group, Standards Track, Jul. 2005, 138 pages.
Raeburn, "Encryption and Checksum Specifications for Kerberos 5", Network Working Group, Standards Track, Feb. 2005, 51 pages.

\* cited by examiner

*Primary Examiner* — Ghazal Shehni
(74) *Attorney, Agent, or Firm* — Brake Hughes Bellermann LLP

(57) ABSTRACT

Methods and apparatus for providing a single-sign-on service are disclosed. An example method includes receiving, at a computing device, a username and a password. The example method further includes providing the username and the password to a cloud-based credential server. The example method also includes receiving, from the cloud-based credential server, authentication information corresponding with the username and the password. The example method still further includes granting or denying access to the computing device and one or more cloud-based services based on the authentication information.

19 Claims, 10 Drawing Sheets

| | User Name 305 | Password 310 |
|---|---|---|
| SERVICE_1  315 | Username_1  320 | Password_1 325 |
| SERVICE_2  330 | Username_2  335 | Password_2 340 |
| SERVICE_3  345 | Username_3  350 | Password_3 355 |
| FEDERATED LOGIN SERVICE 360 | Username_4  365 | Password_4 370 |
| AUTHENTICATION INFORMATION RECORD                         300 | | |

SINGLE SIGN-ON SERVICE

CROSS REFERENCE TO RELATED APPLICATIONS

This application claims the benefit, under 35 U.S.C. §119(e), of U.S. Provisional Patent Application Ser. No. 61/251,292 and U.S. Provisional Patent Application Ser. No. 61/251,293, both filed on Oct. 13, 2009. The disclosures of U.S. Provisional Patent Application Ser. Nos. 61/251,292 and 61/251,293 are both incorporated by reference herein in their entirety.

TECHNICAL FIELD

This application relates in general, to user authentication. More specifically, this application relates to methods and apparatus for providing a single-sign-on service.

BACKGROUND

With the creation of the World-Wide-Web (WWW) and high speed computer networks, the paradigm for personal computer usage has dramatically shifted. In the past, users would primarily use their personal computers to run programs, and store and manipulate data that was located on their local hard-drive. Only rarely would users store or manipulate data located on a network-accessible drive, or run a program that was provided as a network service, and even then, such programs and data were usually restricted to a local area network.

Today, more and more users are storing more and more data on remote data servers, and using remotely provided web-based applications (e.g., SaaS or Software as a Service programs) to manipulate and organize that data. For example, many users today store their personal email and contact information, and even pictures, videos, and music archives on remote servers, and access that data using third party applications that are provided through and controlled by a web-browser.

Cloud computing is a style of computing in which computing resources such as application programs and file storage are remotely provided over the Internet, typically through a web browser. Many web browsers are capable of running applications (e.g., Java applets), which can themselves be application programming interfaces ("API's") to more sophisticated applications running on remote servers. In the cloud computing paradigm, a web browser interfaces with and controls an application program that is running on a remote server (or in a network "cloud"). Through the browser, the user can create, edit, save and delete files on the remote server via the remote application program.

Due to this shift in computer usage, today's computer users are unlikely to want or need many of the features and functions provided by modern operating systems. These users do not need to worry about file structures on their computing devices or organizing or backing up their data, because much of their data is stored, organized and backed up for them on the cloud. Such users do not need to worry about loading and updating software, because most of the software they use is provided to them when needed as a cloud-based service. Instead, today's computer users are more interested in quickly logging onto their computer, launching a web browser, and accessing data and programs of interest to them, which are becoming more and more readily accessible through the WWW.

SUMMARY

In a first general aspect, an example method for performing single-sign-on with a cloud-based computing device may include receiving, at a computing device, a username and a password and providing the username and the password to a cloud-based credential server. The example method may further include receiving, from the cloud-based credential server, authentication information corresponding with the username and the password. The example method may also include granting or denying access to the computing device and one or more cloud-based services based on the authentication information.

In a second general aspect, an example method for automatically accessing, with a cloud-based computing device, a network service provided over a computer network cloud may include receiving, at the computing device, a username and a password and transmitting the username and the password from the computing system to a first server for authentication. The example method may further include receiving, at the computing device, authentication information from the first server, where the authentication information includes a credential needed for accessing the network service located on a second server. The example method may also include sending, from the computing device to the second server, a request to access the network service, where the request includes the credential.

In a third general aspect, an example method for allowing automatic sign onto a network service provided over a computer network cloud may include receiving, at a first server from a computing system, a username/password pair and authenticating, at the first server, the username/password pair by finding a database record that corresponds with the username/password pair. The example method may further include retrieving, from the database record, a credential for accessing the network service at a second server. The example method may also include transmitting, from the first server to the computing system, authentication information, where the authentication information includes the credential.

In a fourth general aspect, an example method for automatically generating an account credential for accessing a cloud-based service located on a first server may include receiving, in a browser, a Uniform Resource Identifier (URI) for the cloud-based service. The example method may also include transmitting, to the first server, a request to send a document identified by the URI and receiving, from the first server, the document identified by the URI. In the example method, the document may include a fillable form for establishing an account for accessing the cloud-based service, the form including a request for an account credential. The example method may further include transmitting, to a second server, a request to auto-generate the account credential, where the request includes the URI for the cloud-based service. The example method may still further include receiving, from the second server, the auto-generated account credential and transmitting, to the first server, a request to generate a user account, the request including the auto-generated account credential.

In a fifth general aspect, an example method for automatically generating an account credential for a cloud-based service located on a first server may include receiving, from a computing system, a request to auto-generate the account credential, where the request includes a Uniform Resource Identifier (URI) for the cloud-based service and a username associated with the request. The example method may also include using a random string generator to auto-generate the account credential and storing the account credential and the URI for the cloud-based service in a database that relates the account credential and the URI with the username. The example method may further include transmitting, to the computing system, the account credential.

In a sixth general aspect, an example method for automatically logging into a cloud-based service located on a first server may include receiving, in a browser, a Uniform Resource Identifier (URI) for the cloud-based service. The example method may further include identifying a user account credential for the cloud-based service by locating a record in a database that relates the URI to the user account credential. The example method may also include retrieving the user account credential from the database record and transmitting, to the first server, a request to log into the cloud-based service, the request including the retrieved user account credential.

In a seventh general aspect, a machine-readable storage medium has instructions stored thereon. The instructions, when executed, provide for implementing an example method for single-sign-on using a cloud-based computing device. The example method may include receiving, at a computing device, a username and a password and providing the username and the password to a cloud-based credential server. The example method may further include receiving, from the cloud-based credential server, authentication information corresponding with the username and the password. The example method may also include granting or denying access to the computing device and one or more cloud-based services based on the authentication information.

In an eighth general aspect, a machine-readable storage medium has instructions stored thereon. The instructions, when executed, provide for implementing an example method for automatically accessing, with a cloud-based computing device, a network service provided over a computer network cloud. The example method may include receiving, at the computing device, a username and a password and transmitting the username and the password from the computing system to a first server for authentication. The example method may further include receiving, at the computing device, authentication information from the first server, where the authentication information includes a credential needed for accessing the network service located on a second server. The example method may also include sending, from the computing device to the second server, a request to access the network service, where the request includes the credential.

In a ninth general aspect, a machine-readable storage medium has instructions stored thereon. The instructions, when executed, provide for implementing an example method for allowing automatic sign onto a network service provided over a computer network cloud. The example method may include receiving, at a first server from a computing system, a username/password pair and authenticating, at the first server, the username/password pair by finding a database record that corresponds with the username/password pair. The example method may further include retrieving, from the database record, a credential for accessing the network service at a second server. The example method may also include transmitting, from the first server to the computing system, authentication information, where the authentication information includes the credential.

In a tenth general aspect, a machine-readable storage medium has instructions stored thereon. The instructions, when executed, provide for implementing an example method for automatically generating an account credential for accessing a cloud-based service located on a first server. The example method may include receiving, in a browser, a Uniform Resource Identifier (URI) for the cloud-based service. The example method may also include transmitting, to the first server, a request to send a document identified by the URI and receiving, from the first server, the document identified by the URI. In the example method, the document may include a fillable form for establishing an account for accessing the cloud-based service, the form including a request for an account credential. The example method may further include transmitting, to a second server, a request to auto-generate the account credential, where the request includes the URI for the cloud-based service. The example method may still further include receiving, from the second server, the auto-generated account credential and transmitting, to the first server, a request to generate a user account, the request including the auto-generated account credential.

In an eleventh general aspect, a machine-readable storage medium has instructions stored thereon. The instructions, when executed, provide for implementing an example method for automatically generating an account credential for a cloud-based service located on a first server. The example method may include receiving, from a computing system, a request to auto-generate the account credential, where the request includes a Uniform Resource Identifier (URI) for the cloud-based service and a username associated with the request. The example method may also include using a random string generator to auto-generate the account credential and storing the account credential and the URI for the cloud-based service in a database that relates the account credential and the URI with the username. The example method may further include transmitting, to the computing system, the account credential.

In a twelfth general aspect, a machine-readable storage medium has instructions stored thereon. The instructions, when executed, provide for implementing an example method for automatically logging into a cloud-based service located on a first server. The example method may include receiving, in a browser, a Uniform Resource Identifier (URI) for the cloud-based service. The example method may further include identifying a user account credential for the cloud-based service by locating a record in a database that relates the URI to the user account credential. The example method may also include retrieving the user account credential from the database record and transmitting, to the first server, a request to log into the cloud-based service, the request including the retrieved user account credential.

In a thirteenth general aspect, an example computing system may be configured to perform single-sign-on for cloud-based computing services. The example computing system may be configured to receive, at the computing device, a username and a password and provide the username and the password to a cloud-based credential server. The example computing system may be further configured to receive, from the cloud-based credential server, authentication information corresponding with the username and the password. The example computing device may also be configured to grant or deny access to the computing device and one or more cloud-based services based on the authentication information.

In a fourteenth general aspect, an example computing system may be configured to automatically access a network service provided over a computer network cloud. The example computing system may be configured to receive, at the computing device, a username and a password and transmit the username and the password from the computing system to a first server for authentication. The example computing system may be further configured to receive, at the computing device, authentication information from the first server, where the authentication information includes a credential needed for accessing the network service located on a second server. The example computing device may also be configured to send, from the computing device to the second server, a request to access the network service, where the request includes the credential.

In a fifteenth general aspect, an example server may be configured to allow automatic sign onto a network service provided over a computer network cloud. The example server may be configured to receive, from a computing system, a username/password pair and authenticate the username/password pair by finding a database record that corresponds with the username/password pair. The example server may be further configured to retrieve, from the database record, a credential for accessing the network service at a second server. The example server may be further configured to transmit, to the computing system, authentication information, where the authentication information includes the credential.

In a sixteenth general aspect, an example computing system may be configured to implement a method for automatically generating an account credential for accessing a cloud-based service located on a first server. The example computing system may be configured to receive, in a browser, a Uniform Resource Identifier (URI) for the cloud-based service. The example computing system may also be configured to transmit, to the first server, a request to send a document identified by the URI and receive, from the first server, the document identified by the URI. The document identified by the URI may include a fillable form for establishing an account for accessing the cloud-based service, the form including a request for an account credential. The example computing system may be further configured to transmit, to a second server, a request to auto-generate the account credential, where the request includes the URI for the cloud-based service. The example computing system may be still further configured to receive, from the second server, the auto-generated account credential and transmit, to the first server, a request to generate a user account, the request including the auto-generated account credential.

In a seventeenth general aspect, an example server may be configured to automatically generate an account credential for a cloud-based service located on a second server. The example server may be configured to receive, from a computing system, a request to auto-generate the account credential, where the request includes a Uniform Resource Identifier (URI) for the cloud-based service and a username associated with the request. The example server may be further configured to use a random string generator to auto-generate the account credential and store the account credential and the URI for the cloud-based service in a database that relates the account credential and the URI with the username. The example server may be further configured to transmit, to the computing system, the account credential.

In an eighteenth general aspect, an example computing system may be configured to implement a method for automatically logging into a cloud-based service located on a first server. The example computing system may be configured to receive, in a browser, a Uniform Resource Identifier (URI) for the cloud-based service. The example computing system may be further configured to identify a user account credential for the cloud-based service by locating a record in a database that relates the URI to the user account credential. The example computing system may also be configured to retrieve the user account credential from the database record and transmit, to the first server, a request to log into the cloud-based service, the request including the retrieved user account credential.

BRIEF DESCRIPTION OF THE DRAWINGS

Like reference symbols in the various drawings indicate like elements.

DETAILED DESCRIPTION

Figure 1:
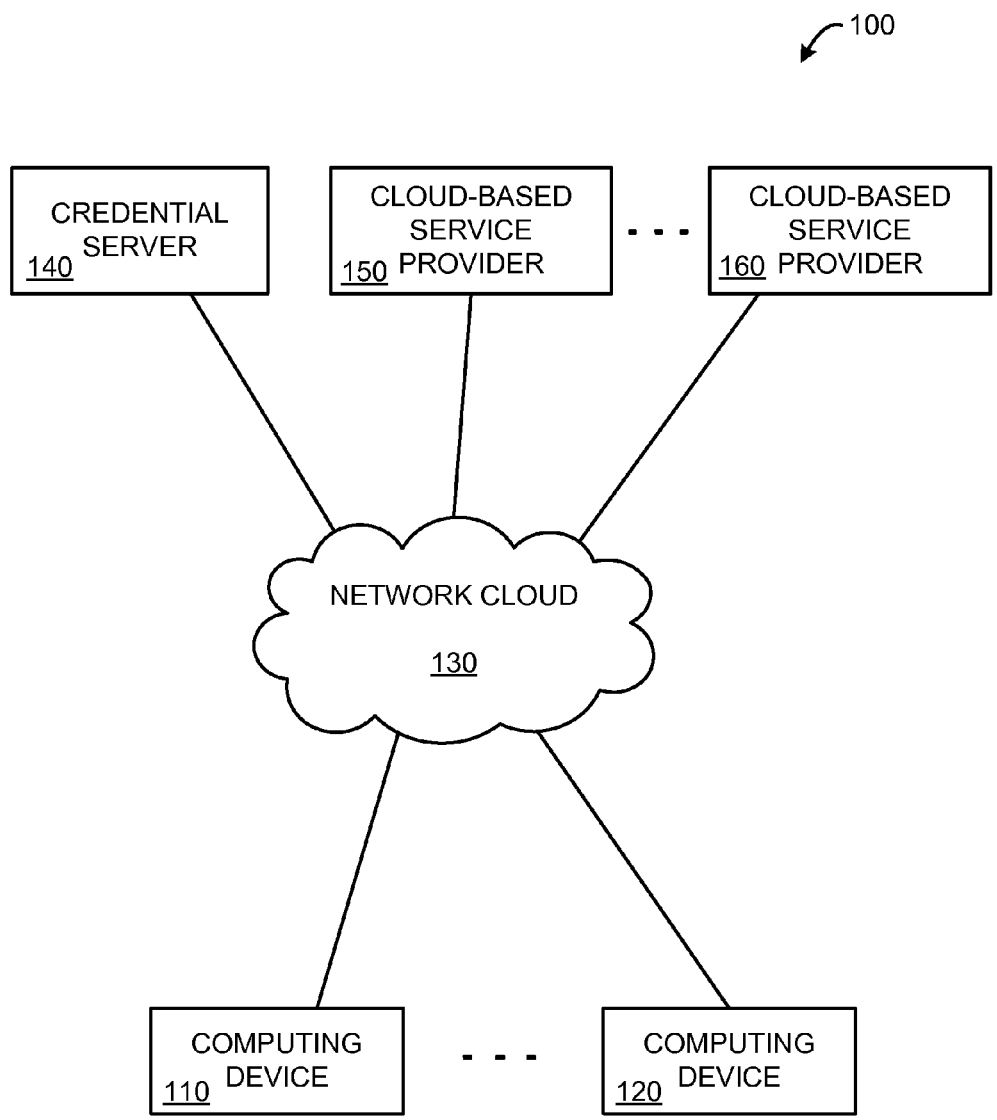
FIG. 1 is a block diagram illustrating a computing network in accordance with an example embodiment.

FIG. 1 is a block diagram illustrating a computing network 100 in accordance with an example embodiment. The network 100 may be used to implement techniques for providing single-sign-on services, such as those described herein. Using such approaches may allow a user the flexibility to log into a cloud-based computing account from multiple cloud-based computers (including cloud-based computers that are not owned by the user) and, upon successfully logging in, access various cloud-based services (e.g., using authentication information associated with the user's account) without separately logging into those services. The network 100 is an example configuration and other network configurations may also be used.

Such cloud-based services may include browser-based applications, file storage services, online games, among a number of other services. Depending on the particular cloud-based service, users of those services may establish an account with a provider of a cloud-based service and log into a provider's server (e.g., using a Web interface) in order to access/use cloud-based services provided by a specific provider. For example, a user may establish an account with Google (using Google Accounts). Once a user has established his/her account, the user may then access cloud-based services provided by Google, such as Google Mail and Google Docs, among other cloud-based services. In order to access cloud-based services provider by other organizations, a user would typically establish a separate account with each provider, or may use a federated login service (such as OpenID) to access cloud-based service providers that recognize a particular federated login service with which a user has an account.

As shown in FIG. 1, the network 100 includes multiple computing devices 110-120. While only two computing devices are explicitly shown, as indicated in FIG. 1, the approaches described herein may be implemented using other numbers of computing devices. The computing devices 110 and 120 may communicate with other devices via a network cloud 130. The network cloud 130 may take a number of forms. For instance, the network cloud 130 may be the Internet, a Wide Area Network a wireless network, or may be implemented using any appropriate data communication network.

In the network 100, the computing devices 110 and 120 may communicate with a credential server 140 and multiple cloud-based service provider servers 150-160. As shown in FIG. 1, the network 100 may include other numbers of cloud-based service providers. In the network 100, the credential server 140 may be configured to facilitate a single-sign-on service, such as using the techniques described herein. Also, in certain embodiments, the credential server 140 may also provide cloud-based services for users of the computing devices 110 and 120.

Figures 2, 3:
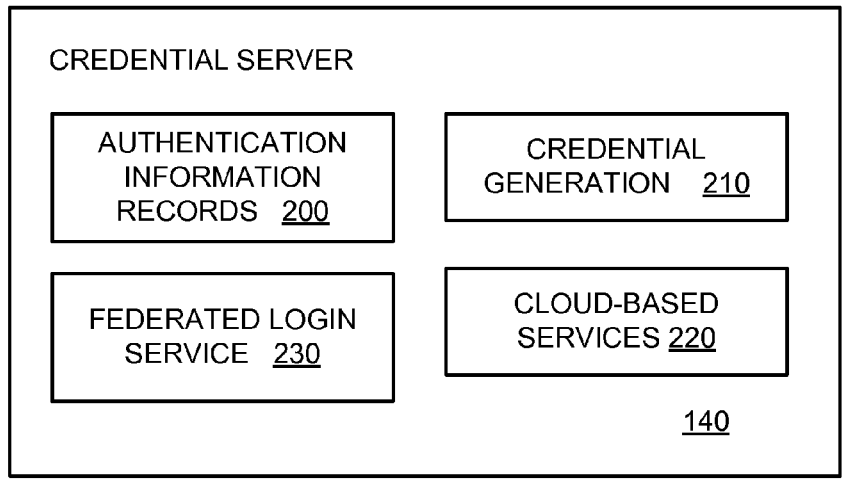
FIG. 2 is a block diagram illustrating a credential server in accordance with an example embodiment.
FIG. 3 is a diagram illustrating an authentication information record in accordance with an example embodiment.

FIG. 2 is a block diagram illustrating a credential server 140 in accordance with an example embodiment. The credential server 140 may be implemented in the network 100 shown in FIG. 1. In other embodiments, other credential server configurations may be used. As shown in FIG. 2, the credential server 140 includes authentication information records 200, a credential generation module 220, cloud-based services 220 and a federated login service 230. In other configurations, the credential server 140 may include other elements and/or may omit one or more of the elements shown in FIG. 2, such as the cloud-based services 220 and the federated login service 230.

In the credential server 140, the authentication information records 200 may comprise a database that includes individual records corresponding with user accounts. FIG. 3 illustrates an example of such a database record, which is described in further detail below. Each of these database records may include a plurality of account credentials for various cloud-based services that associated with a respective user. Those account credentials may be used (e.g., using the techniques described herein) to provide a single-sign-on service for the respective user. For instance, a user may log into a cloud-based computing device using a username and password for an account that is maintained on the credential server 140. Once the user has successfully logged into the cloud-based computing device, the account credentials in the user's respective authentication information record 200 may be used to automatically log the user into the user's other cloud-based service provider accounts without the user having to separately enter the individual account credentials for each service provider.

In this example, the credential server 140 may use the credential generation module 210 to automatically generate account credentials for a user to establish new accounts with cloud-based service providers, such as for providers with which the user has not previously set up an account. For instance, the credential generation module 210 may randomly generate an account credential (e.g., a username and password pair) for a user to establish such an account. In one embodiment, the account credential generation module 210 may use criteria provided by a cloud-based service provider during the account setup process. In an alternative approach, the credential generation module 210 may include a database of cloud-based service providers that includes account credential criteria for those providers. Such account credential criteria may include parameters that define the format and content of account credentials for the respective provider. For example, such criteria may include the number of characters (e.g., a minimum and a maximum number of characters) required for a username and/or password, whether symbols are required or prohibited, among other possible account credential criteria. In other embodiments, the credential generation module may be implemented in a user computing device, such as the computing devices 110 and 120 illustrated in FIG. 1.

As was discussed above, the credential server 140 may also provide cloud-based services 220 to users. In such an approach, the account credentials for accessing the cloud-based services 220 may be same as those used to initially authenticate users on the credential server 140, or may be different account credentials. The particular arrangement used will depend on the particular embodiment. For example, a provider may allow users to setup accounts on the credential server 140 at no cost but may require payment for use of the cloud-based services 220. In such an approach, different account credentials may be used to access the cloud-based services 220 than the account credentials used when facilitating single-sign-on services.

The federated login service 230 of the credential server 140 may be used to provide federated login services to users with accounts on the credential server 140. Such federated login services (such as OpenID) allow users to establish an account with the federated login service 230 and access cloud-based services of providers that recognize the federated login service 230 as an authentication authority using their federated login service account.

FIG. 3 is a diagram illustrating an authentication information record 300 in accordance with an example embodiment. The record 300 may be included, for example, in the authentication information records 200 of the credential server 140. The record 300 may be used by the credential server 140 to facilitate a single-sign-on service for a user with a username 305. The user may access the record 300 in the credential server 140 by logging into a computing system (such as the computing system 110) using the username 305 and a password 310. For instance, the credential server 140 may authenticate the user's access to the credential sever 140 using the username 305 and the password 310. As discussed above, the record 300 may be included in a database of such records for a plurality of users, such as in the authentication information records 200 of the credential server 140.

As shown in FIG. 3, in addition to the username 305 and the password 310, the record 300 may also include information to allow a user to access one or more of the user's cloud-based services accounts. In one implementation, the record 300 may store this information in the form of authorization tokens or cookies for a plurality of cloud-based services accounts. These tokens may be provided in the form of cookies that are sent to a computing device (e.g., the computing device 110 or the computing device 120) when the user logs onto the computing device using, for example, local login information. In an example embodiment, such local login information may be the same as the username 305 and the password 310.

In other implementations, information that allows a user to access one or more cloud-based services can be stored in database 300 in the form of a service identifier, and a username/password pair that corresponds to that service identifier. The service identifier can be stored, for example, in the form of a Uniform Resource Identifier (URI) or, alternatively, as a website name. For example, as shown in FIG. 3, the record 300 may store a service identifier SERVICE_1 315 together with a Username_1 320 and a Password_1 325 that provide the account credential information needed to log into and access a cloud-based service account that is pointed to by the SERVICE_1 identifier 315.

Similarly, the record 300 can store service identifiers SERVICE_2 330 and SERVICE_3 345, and respective Username_2 335 and Username_3 350, along with respective passwords Password_2 340 and Password_3 355 that may be used to log into and access cloud-based services accounts that are pointed to by the service identifiers 330 and 345. In this implementation, when a user wishes to log into, or access a cloud-based service account, such as cloud-based services pointed to by the service identifier 315, from a computing device, a web browser on the computing device may first send the URI for the service in a request to the credential server 140 to determine if the credential server 140 has account credential information for that service in the user's authentication information record 300. If the credential server 140 does have the information, the credential server 140 may send the Username_1 320 and the Password_1 325 for the service 315 to the computing device the user has logged into. In this example, the web browser may then send a request to the service 315 which includes the Username_1 320 and the Password_1 325 to automatically log the user into the cloud-based service.

In other implementations, the credential server may provide the record 300 to a computing device whenever a user logs onto that computing device and is authenticated by the computing device and/or the credential server 140. In such an approach, the computing device the user has logged into may locally store the record 300 and use the locally stored record 300 to access the user's cloud-based services accounts. In this arrangement, when a user requests to use a cloud-based service, such as the service 315, the web browser on the computing device may examine a local database on the computer for the user's record 300. If the browser finds the user's record 300 and determines that the record 300 includes an account credential for the service 315, the browser may send a request to the cloud-based service 315 that includes the username 320 and the password 325 in order to automatically access the service. In some embodiments, to protect the security of usernames and passwords, such requests may be encrypted prior to being sent.

As shown in FIG. 3, the record 300 may also include an indicator for a federated login service 360 and a corresponding Username_4 365 and a Password_4 370 for an account of the user with the federated login service 360. The account credentials for the federated login service 360 can be used by a browser of a computing system in the same fashion as discussed above with respect to the account credentials for the cloud-based services 315, 330 and 345 to automatically authenticate the user with the federated login service 360.

Figure 4:
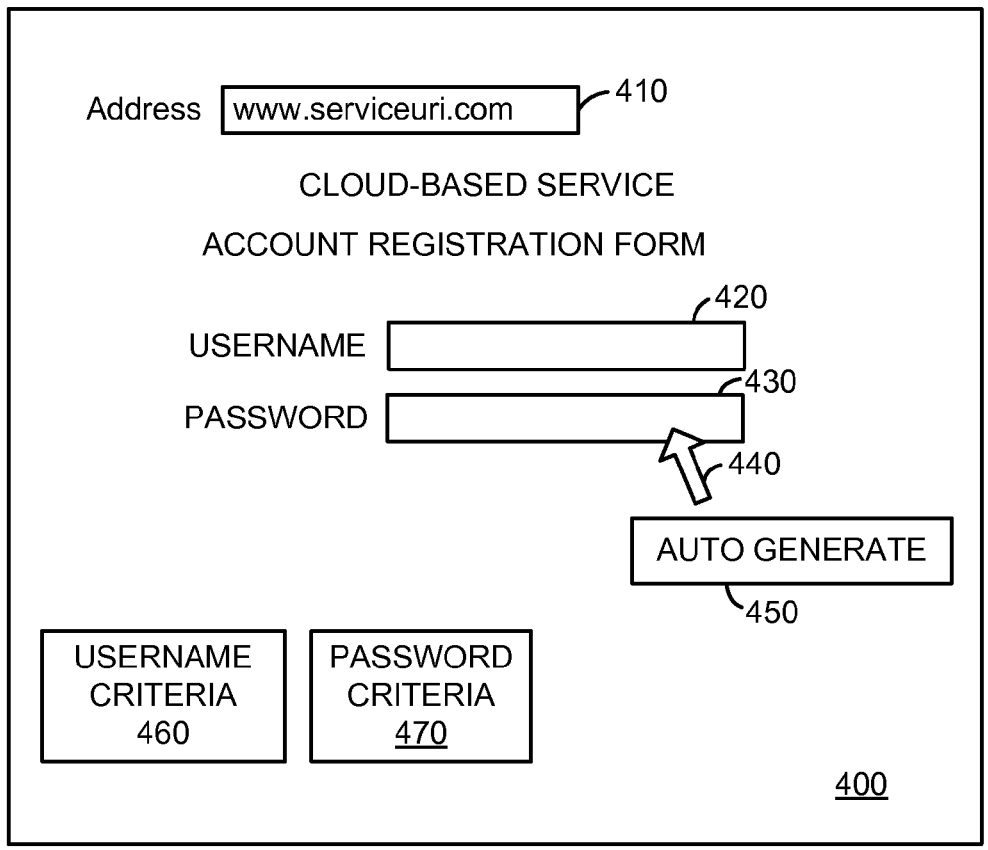
FIG. 4 is a diagram illustrating a form for establishing an account for accessing a cloud-based service in accordance with an example embodiment.

FIG. 4 is a diagram illustrating a form 400 for establishing an account for accessing a cloud-based service in accordance with an example embodiment. With further reference to FIGS. 1-3, a user may log into computing device 110, such as discussed above, and access cloud-based service provider 160 via the network cloud 130. The computing device 110 may examine the record 300 and determine that the record does not include an account credential for the provider 160. In this situation, a browser of the computing system 110 may send a request to the provider 160 at a URI 410 without any account credential information. The provider 160 may then send the form 400 to the computing system 110, which may be displayed in the computing system 110's browser.

As shown in FIG. 4, the form 400 may include a username field 420 and a password field 430, which may be used to setup an account credential for a user account with the provider 160. In an example embodiment, the user may use a mouse pointer to select either of the fields 420 and 430 and then click (e.g., right click) on the selected field. After clicking on the selected field, the browser may provide the user with an option 450 to request that the user account credential (e.g., a username/password pair) be automatically generated. In response to this request, the computing system 110 may automatically generated the credential. Alternatively, the computing system 110 may send a request to the credential server 140 to automatically generate the credential, which the credential server 140 may send back to the computing system 110. Once the credential is generated and approved by the provider 160, the credential server 140 and/or the computing system 110 may add the generated credential to the user's authentication information record 300. If an account credential is generated that is not approved by the provider 160 (e.g., because the username is already taken by another user), the process may be repeated until the provider 160 approves the generated credential.

As previously discussed, the credential may be generated in accordance with username criteria 460 and password criteria 470. The criteria 460 and 470 may be provided in a number of fashions. For instance, the criteria 460 and 470 may be explicitly listed on the form 400, may be provided in metadata, or may be provided in other fashions. For instance the criteria 460 and 470 may be provided as regular expressions that define the allowed format for the username 410 and the password 420. In an example embodiment, the credential may be generated using a random number or random string generator. Of course, a number of other appropriate techniques may be used to generate user account credentials.

FIGS. 5-13 are flowcharts illustrating methods that may be used to facilitate single-sign-on for accessing cloud-based services. The methods illustrated in FIGS. 5-13 may be implemented using the techniques described above with respect to FIGS. 1-4. Of course, the methods of FIGS. 5-13 may be implemented in other fashions as well. Furthermore, the approaches illustrated in FIGS. 5-13 may be implemented in conjunction with one another. In other approaches, some operations of FIGS. 5-13 may be omitted, while other operations may be added.

Figure 5:
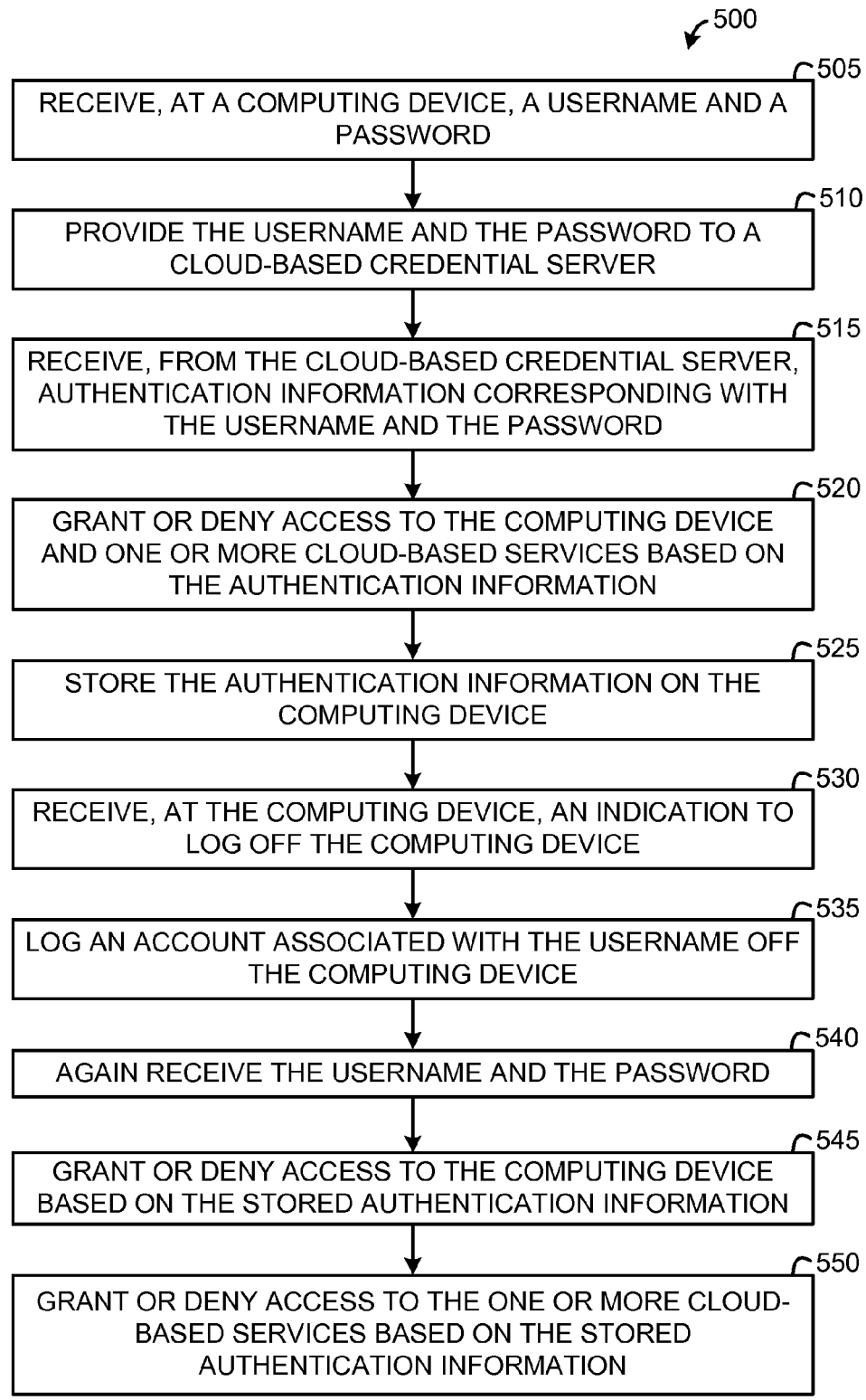
FIG. 5 is a flowchart illustrating a method for user authentication in accordance with an example embodiment.

FIG. 5 is a flowchart illustrating a method 500 for user authentication for a single-sign-on service in accordance with an example embodiment. The method 500 includes, at block 505, receiving, at a computing device, a username and a password. At block 510, the method 500 includes providing the username and the password to a cloud-based credential server. At block 515, the method 500 includes receiving, from the cloud-based credential server, authentication information corresponding with the username and the password. The method 500 also includes, at block 520, granting or denying access to the computing device and one or more cloud-based services based on the authentication information.

At block 525, the method 500 includes storing the authentication information on the computing device. The method 500 further includes, at block 530 receiving, at the computing device, an indication to log off the computing device and, at block 535, logging an account associated with the username off the computing device. At block 540, the method 500 includes again receiving, at the computing device, the username and the password, and at block 545, granting or denying access to the computing device based on the stored authentication information.

The method 500 also includes, at block 550, granting or denying access to the one or more cloud-based services based on the stored authentication information. Such an approach allows a user to automatically access his or her cloud-based services accounts that are reflected in a user's authentication information record, such as described above, without having to access the credential server. Such an approach facilitates providing for single-sign-on even in the event that the credential server is not available.

Figure 6A:
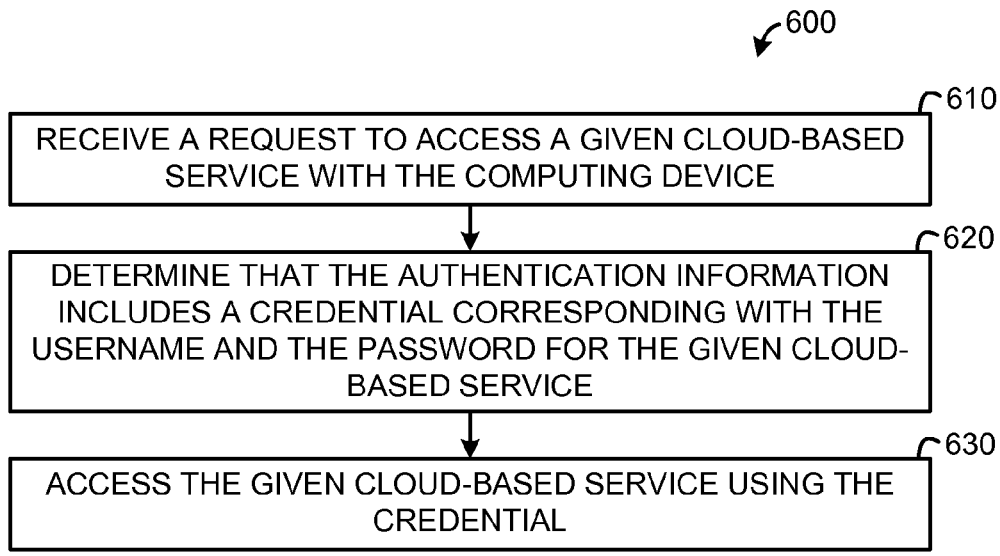
FIGS. 6A and 6B are flowcharts illustrating methods for automatically performing authentication for a cloud-based service in accordance with an example embodiment.
Figure 6B:
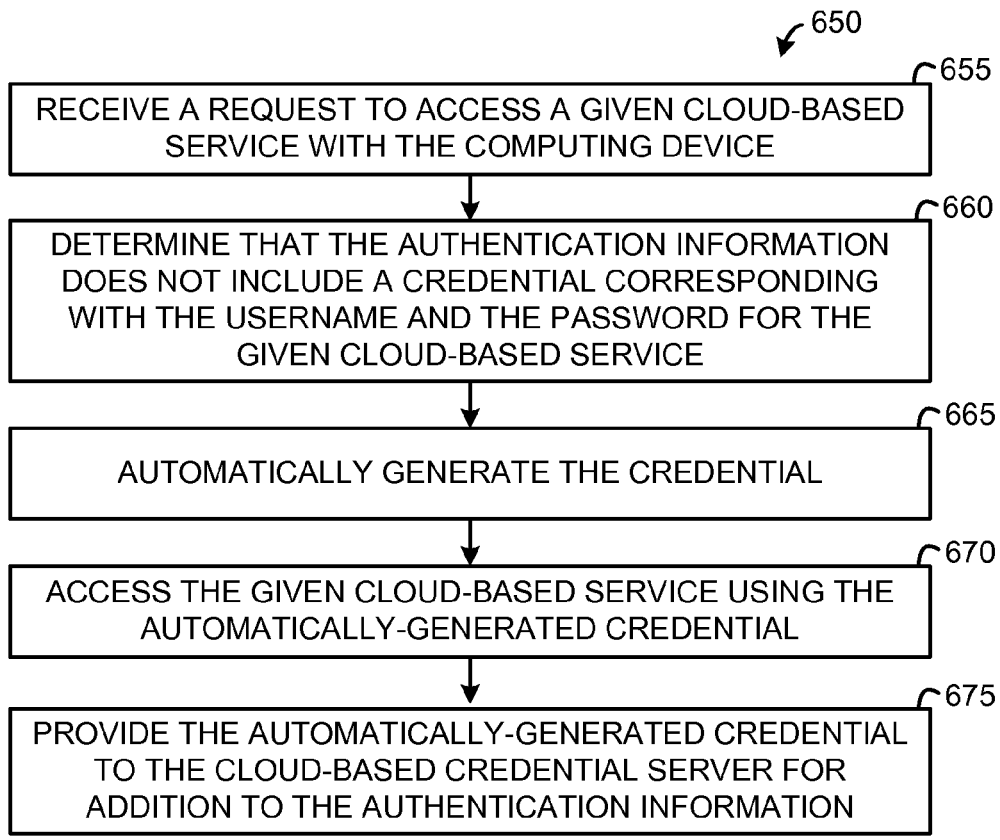

FIGS. 6A and 6B are flowcharts illustrating methods for automatically performing authentication for a cloud-based service in accordance with an example embodiment. The methods illustrated in FIGS. 6A and 6B are described with reference to the authentication information, username and password of FIG. 5 and may be implemented in conjunction with the method 500 illustrated in FIG. 5. FIG. 6A illustrates a method 600 where the authentication information already includes a credential for accessing a cloud-based service, while FIG. 6B illustrates a method 650 where the authentication information does not include a credential for accessing the cloud-based service.

As shown in FIG. 6A, the method 600 includes, at block 610, receiving a request to access a given cloud-based service with a computing device. At block 620, the method 600 includes determining that the authentication information includes a credential for the given cloud-based service corresponding with the credential server username and password. At block 630, the method 600 includes accessing the given cloud-based service using the credential.

As shown in FIG. 6B, the method 650 includes, at block 655, receiving a request to access a given cloud-based service with a computing device. At block 660, the method 600 includes determining that the authentication information does not include a credential for the given cloud-based service corresponding with the credential server username password. At block 665, the method 600 includes automatically generating the credential, such as in the fashions discussed above. At block 670, the method 650 includes accessing the given cloud-based service using the automatically-generated credential.

At block 675, the method 650 includes providing the automatically-generated credential to the credential server for addition to the authentication information. Such an approach may be used in embodiments where the computing device generates the credential. In other embodiments, the computing device may send a request (e.g., in response to a user request) to the credential server to generate the credential, such as using the approach discussed below with respect to FIG. 7.

Figure 7:
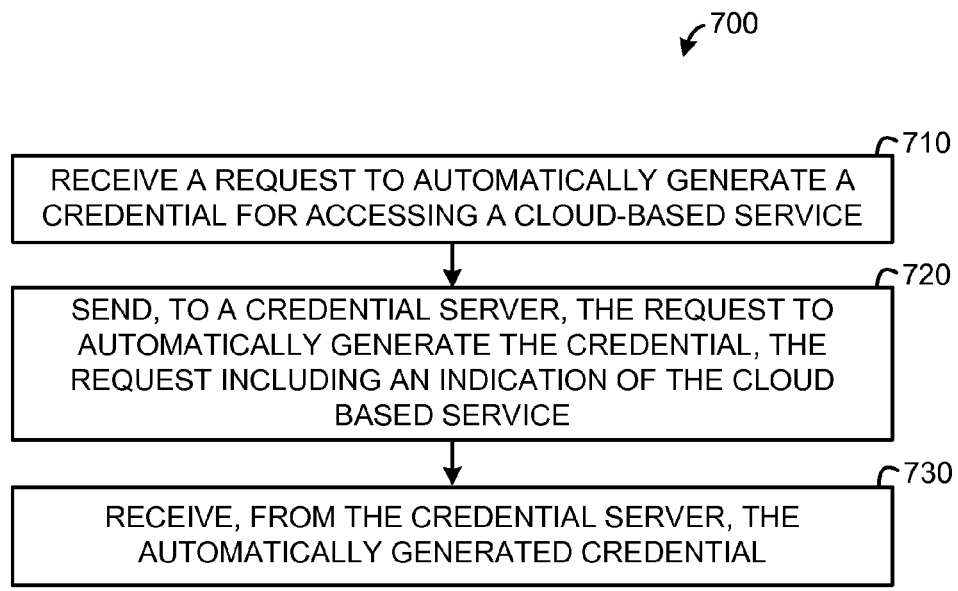
FIG. 7 is a flowchart illustrating a method for automatically generating a credential for accessing a cloud-based service in accordance with an embodiment of the invention.

FIG. 7 is a flowchart illustrating a method 700 for automatically generating a credential for accessing a cloud-based service in accordance with an embodiment of the invention. The method 700 includes, at block 710, receiving a request (e.g., from a user) to automatically generate the credential and, at block 720, sending the request to a credential server. At block 730, the method 700 includes receiving the automatically generated credential from the credential server. In the method 700, the automatically-generated credential may also be added to an authentication information record for a respective user. For instance, the automatically-generated credential may be added to an authentication information record stored on the credential server and/or an authentication information record stored on a user's computing device.

Some users may access cloud-based services from multiple devices. In this situation, the techniques described herein may be used to synchronize a user's authentication information between different computing devices. For example, a user account credential may be created for a user while using one computing device. That user account credential may then be added to the user's authentication information record stored on a credential server. When the user subsequently logs into a second computing device, the authentication information record with the new credential stored on the credential server may be used to update a previously stored record for the user on the second computing device, such as using the approach illustrated in FIG. 8.

Figure 8:
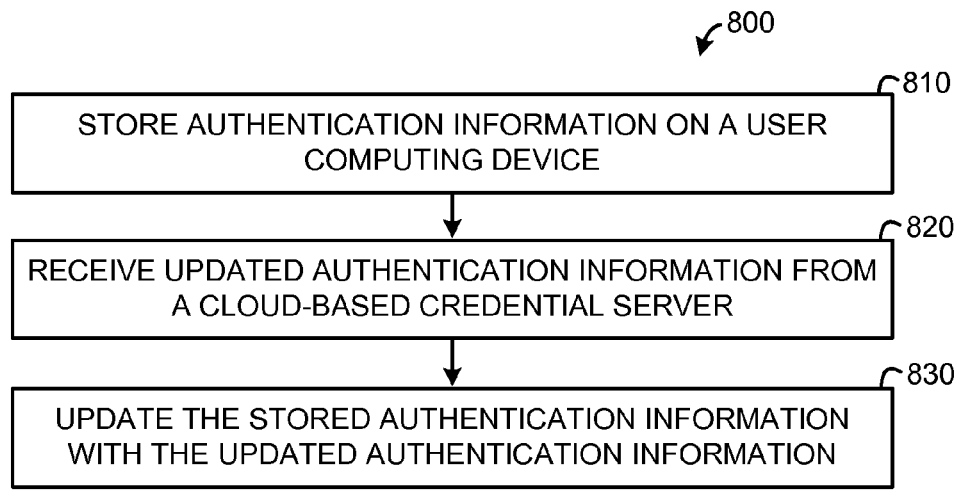
FIG. 8 is a flowchart illustrating a method for updating authentication information in accordance with an example embodiment.

FIG. 8 is a flowchart illustrating a method 800 for updating authentication information in accordance with an example embodiment. The method 800 includes, at block 810, storing authentication information on a computing device (e.g., the second computing device in the above example). After the authentication information record on the credential server is updated with the new credential, such as discussed above, the method 800 may include, at block 820, receiving the updated authentication information from the cloud-based credential server, where the updated authentication information includes the new credential for the new cloud-based service. At block 830, the method 800 includes updating the stored authentication information with the updated authentication information.

Figure 9:
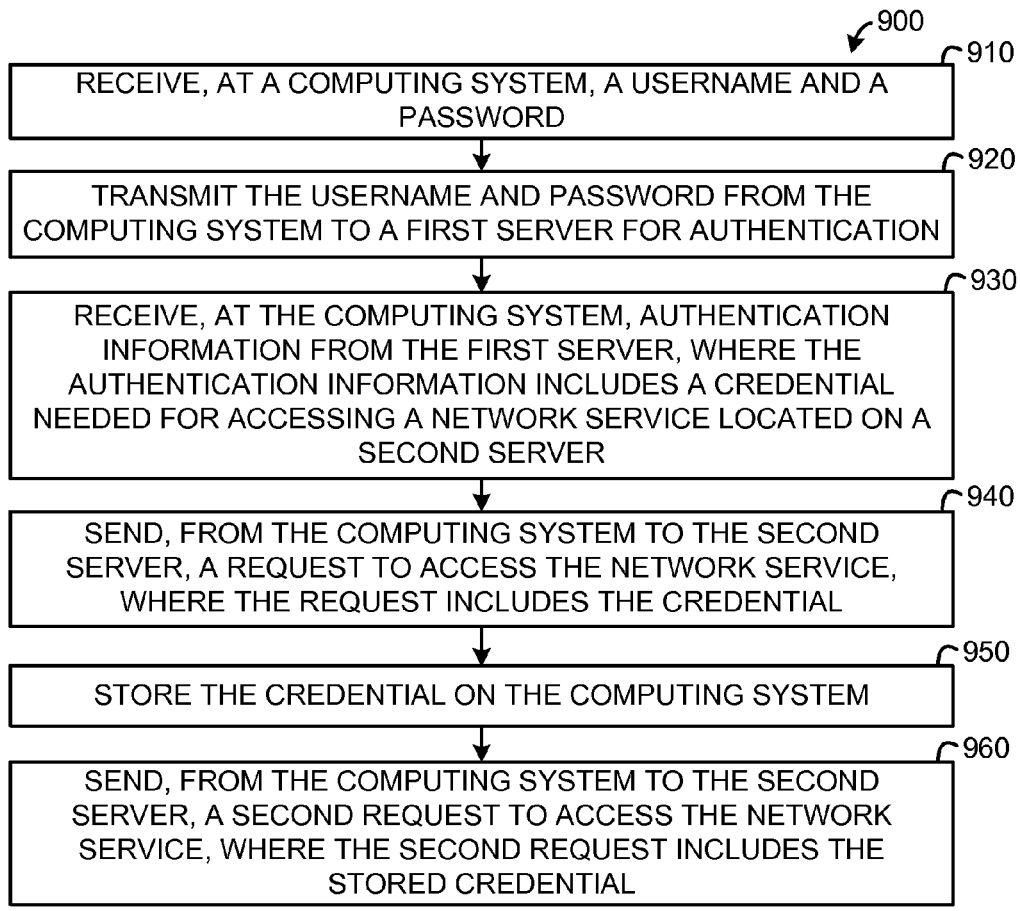
FIG. 9 is a flowchart illustrating a method for automatically accessing a cloud-based service in accordance with an example embodiment.

FIG. 9 is a flowchart illustrating a method 900 for automatically accessing a network (cloud-based) service in accordance with an example embodiment. The method 900 includes, at block 910, receiving, at a computing system, a username and a password and, at block 920, transmitting the username and the password from the computing system to a first server for authentication. The method 900 further includes, at block 930, receiving, at the computing system, authentication information from the first server, where the authentication information includes a credential needed for accessing a network cloud-based service located on a second server. The method 900 also includes, at block 940, sending, from the computing system to the second server, a request to access the network service, where the request includes the credential. At block 950, the method 900 includes, storing the credential on the computing system. At block 960, the method 900 includes sending, from the computing system to the second server, a second request to access the network service, wherein the second request includes the stored credential.

Figure 10:
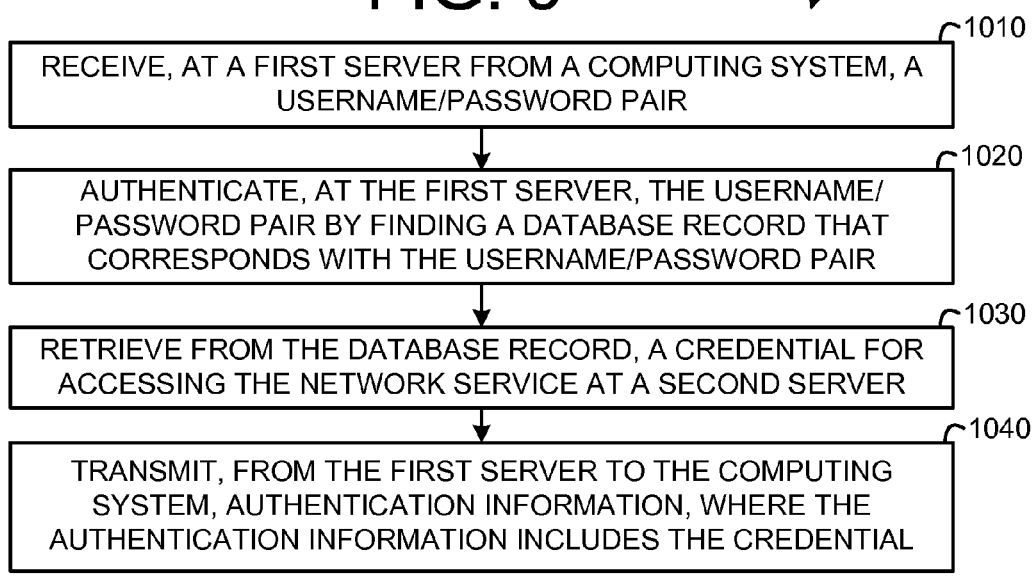
FIG. 10 is a flowchart illustrating a method for authenticating access to a cloud-based service in accordance with an example embodiment.

FIG. 10 is a flowchart illustrating a method 1000 for authenticating access to a network (cloud-based) service in accordance with an example embodiment. The method 1000 includes, at block 1010, receiving, at a first server from a computing system, a username/password pair and, at block 1020, authenticating, at the first server, the username/password pair by finding a database record that corresponds with the username/password pair. The method 1000 also includes, at block 1030, retrieving, from the database record, a credential for accessing the network service at a second server. At block 1040, the method 1000 includes transmitting, from the first server to the computing system, authentication information, wherein the authentication information includes the credential. As was discussed above, the credential server may also provide cloud-based services. Therefore, the first server and the second server may be the same server, as may also be the case with the other approaches described herein. As also previously discussed, the credential may one of an authorization token, a cookie, and a username/password pair for accessing the network service, which may be the case with the other approaches described herein as well.

Figure 11:
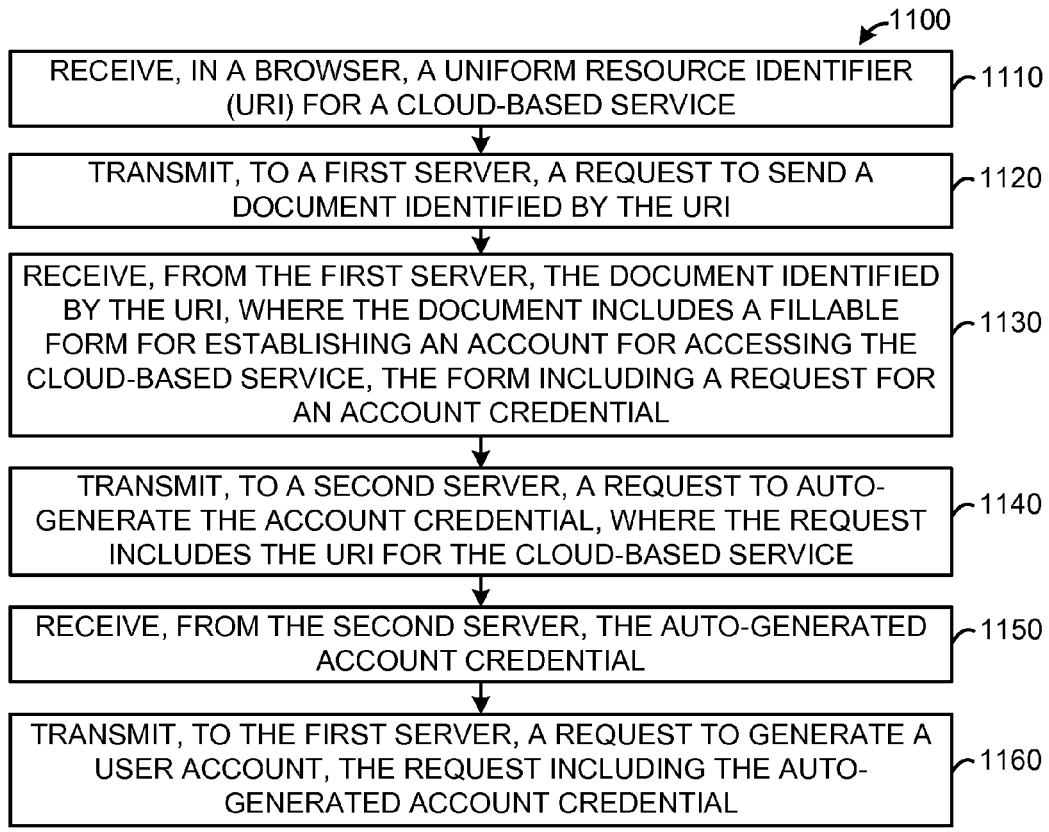
FIG. 11 is a flowchart illustrating a method for automatically generating an account credential for accessing a cloud-based service in accordance with an example embodiment.

FIG. 11 is a flowchart illustrating a method 1100 for automatically generating an account credential for accessing a cloud-based service in accordance with an example embodiment. The method includes, at block 1110, receiving, in a browser, a Uniform Resource Identifier (URI) for the cloud-based service. At block 1120, the method 1100 includes transmitting, to the first server, a request to send a document identified by the URI. At block 1130, the method 1100 includes receiving, from the first server, the document identified by the URI, where the document includes a fillable form for establishing an account for accessing the cloud-based service, the form including a request for an account credential, such the form 400 discussed above with respect to FIG. 4.

At block 1140, the method 1100 includes transmitting, to a second server, a request to auto-generate the account credential, wherein the request includes the URI for the cloud-based service. The method 1100 further includes, at block 1150, receiving, from the second server, the auto-generated account credential. At block 1160, the method 1100 includes transmitting, to the first server, a request to generate a user account, the request including the auto-generated account credential. As previously discussed, the account credential may include a credential selected from a group consisting of a username and a password.

Figure 12:
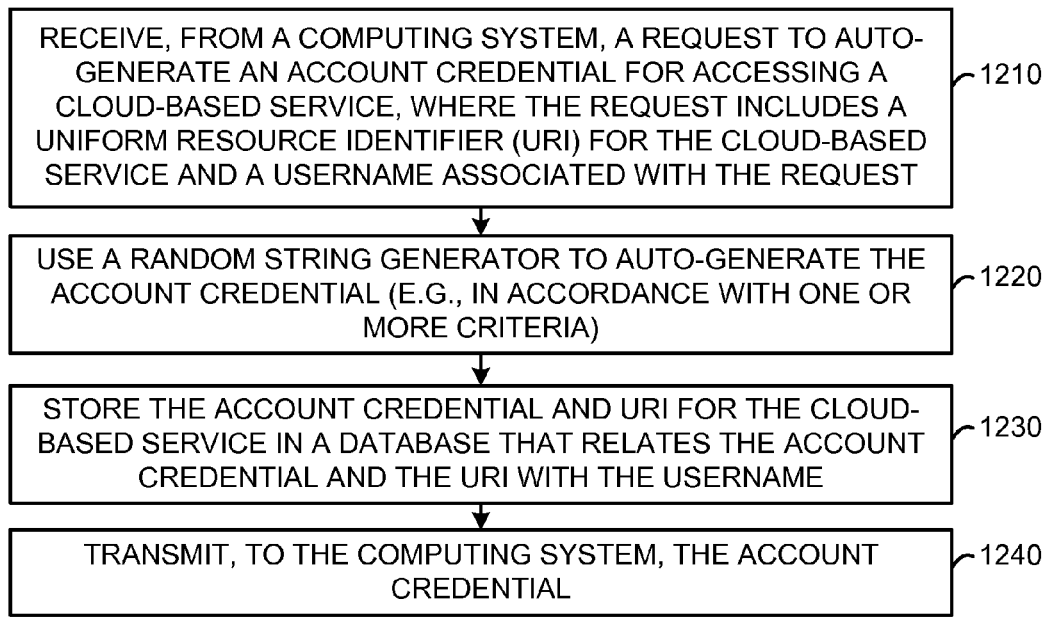
FIG. 12 is a flowchart illustrating another method for automatically generating an account credential for accessing a cloud-based service in accordance with an example embodiment.

FIG. 12 is a flowchart illustrating another method 1200 for automatically generating an account credential for accessing a cloud-based service in accordance with an example embodiment. The method 1200 includes, at block 1210 receiving, from a computing system, a request to auto-generate the account credential, where the request includes a Uniform Resource Identifier (URI) for the cloud-based service and a username associated with the request. At block 1220, the method 1200 includes using a random string generator to auto-generate the account credential. At block 1230, the method 1200 includes storing the account credential and the URI for the cloud-based service in a database that relates the account credential and the URI with the username. The method 1200 also includes, at block 1240 transmitting, to the computing system, the account credential. As previously discussed, the account credential may include a credential selected from a group consisting of a username and a password.

Figure 13A:
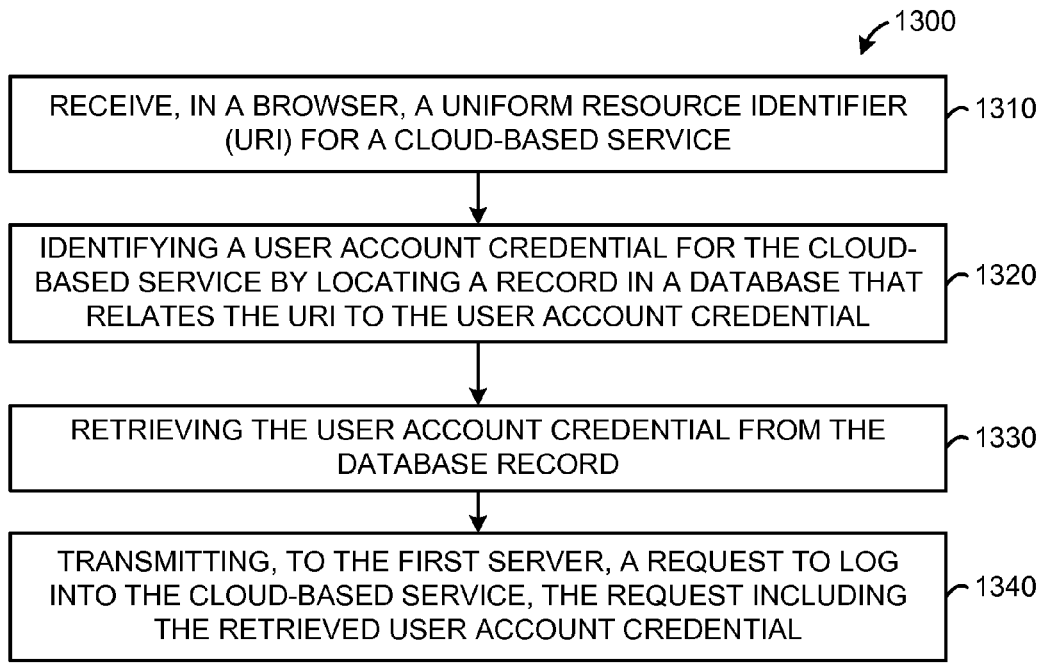
FIGS. 13A and 13B are flowcharts illustrating methods for automatically logging into a cloud-based service in accordance with an example embodiment.
Figure 13B:
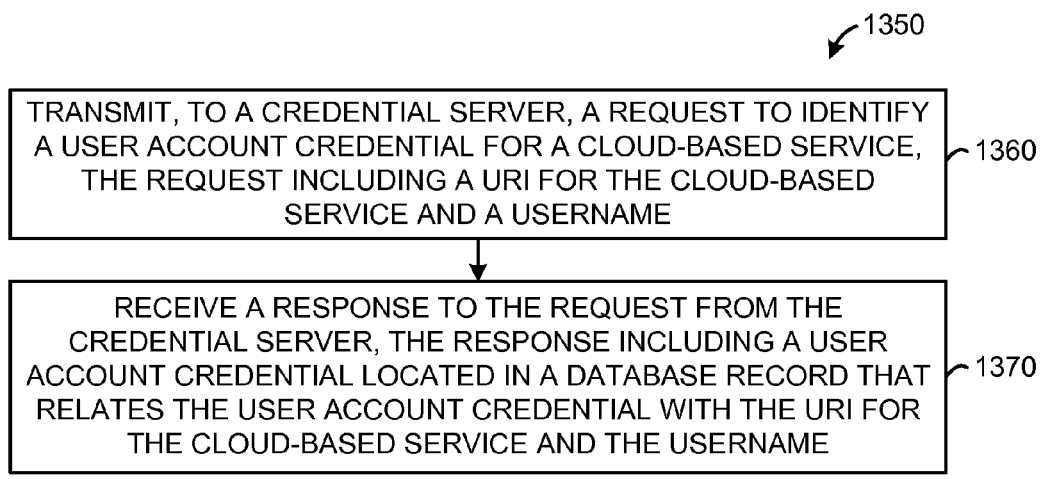

FIGS. 13A and 13B are flowcharts illustrating methods 1300 and 1350 for automatically logging into a cloud-based service in accordance with example embodiments. The method 1300 of FIG. 13A includes, at block 1310, receiving, in a browser, a Uniform Resource Identifier (URI) for the cloud-based service. At block 1320, the method 1300 includes identifying a user account credential for the cloud-based service by locating a record in a database that relates the URI to the user account credential. At block 1330, the method 1300 includes retrieving the user account credential from the database record. At block 1340, the method 1300 includes transmitting, to the first server, a request to log into the cloud-based service, the request including the retrieved user account credential.

The method 1350 of FIG. 13B includes, at block 1360, transmitting, to a credential server, a request to identify a user account credential for the cloud-based service, the request including the URI for the cloud-based service and a username. At block 1370, the method 1350 include receiving a response to the request from the credential server, the response including a user account credential located in a database record that relates the user account credential with the URI for the cloud-based service and the username.

Figure 14:
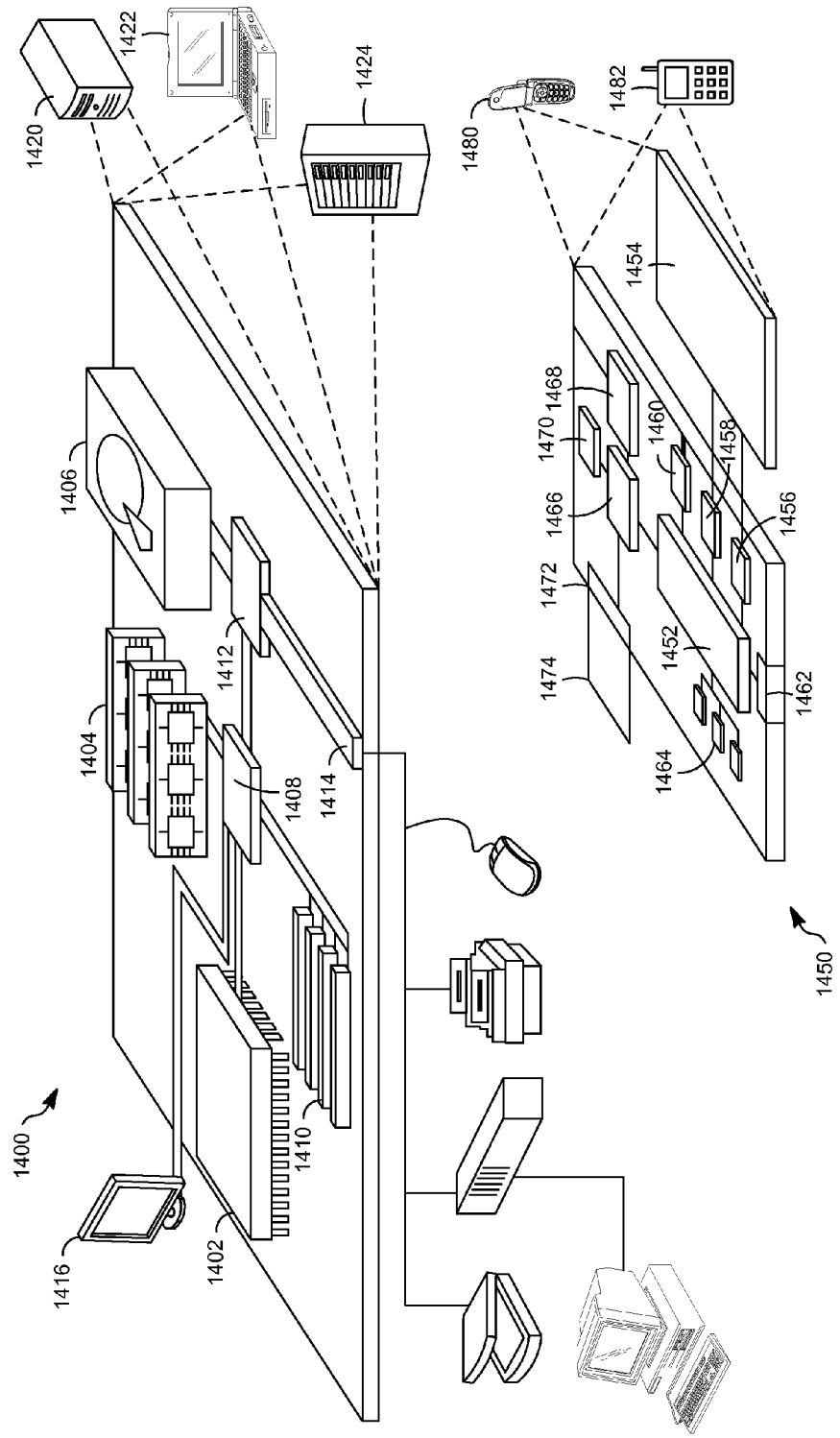
FIG. 14 shows an example of a computing device and a mobile computing device that can be used to implement the techniques described herein.

FIG. 14 is a diagram that shows an example of a generic computer device 1400 and a generic mobile computer device 1450, which may be used with the techniques described here. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468, are interconnected using various buses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provide in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provide as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, or memory on processor 1452, which may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, WiFi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1480. It may also be implemented as part of a smart phone 1482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal.

The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   receiving, at a computing device, a username and a password;
   providing the username and the password to a cloud-based credential server;
   receiving, from the cloud-based credential server, authentication information corresponding with the username and the password; and
   granting or denying access to the computing device and a first cloud-based service included on a first cloud-based service provider server based on the authentication information;
   receiving, at the computing device, a request to access a second cloud-based service included on a second cloud-based service provider server, the second cloud-based service provider server being operationally separate from the first cloud-based service provider server;
   determining if the authentication information includes a credential corresponding with the username for the second cloud-based service;
   in the event the credential is included in the authentication information, accessing the second cloud-based service using the credential; and
   in the event the credential is not included in the authentication information:
      automatically generating the credential; and
      accessing the second cloud-based service using the automatically-generated credential.

2. The computer-implemented method of claim 1, further comprising:
   storing the authentication information on the computing device;
   receiving, at the computing device, an indication to log off the computing device;
   logging an account associated with the username off the computing device;
   again receiving, at the computing device, the username and the password; and
   granting or denying access to the computing device based on the stored authentication information.

3. The computer-implemented method of claim 2, further comprising granting or denying access to at least one of the first cloud-based service and the second cloud-based service based on the stored authentication information.

4. The computer-implemented method of claim 1, further comprising providing the automatically-generated credential to the cloud-based credential server for addition to the authentication information.

5. The computer-implemented method of claim 1, wherein automatically generating the credential comprises: sending, from the computing device to the cloud-based credential server, a request to automatically generate the credential, the request including an indication of the second cloud-based service; and receiving, from the cloud-based credential server, the automatically-generated credential.

6. The computer-implemented method of claim 1, wherein automatically generating the credential comprises automatically generating the credential in response to the request to automatically generate the credential.

7. The computer-implemented method of claim 1, wherein automatically generating the credential comprises randomly generating a username/password pair for accessing the second cloud-based service.

8. The computer-implemented method of claim 7, wherein randomly generating the username/password pair comprises randomly generating the username/password pair in accordance with criteria provided to the computing device from the second cloud-based service.

9. The computer-implemented method of claim 1, wherein:
   the authentication information includes a credential corresponding with the username for a cloud-based federated authentication service; and
   the method further includes accessing at least one of the first cloud-based service and the second cloud-based service using the credential.

10. The computer-implemented method of claim 1, wherein receiving the authentication information comprises receiving one or more browser cookies.

11. The computer-implemented method of claim 1, further comprising: storing the authentication information on the computing device; receiving updated authentication information from the cloud-based credential server; and updating the stored authentication information with the updated authentication information.

12. The computer-implemented method of claim 11, wherein the updated authentication information includes a credential associated with the username for at least one additional cloud-based service.

13. The computer-implemented method of claim 1, wherein the cloud-based credential server and the first cloud-based service provider server are a same server.

14. The computer-implemented method of claim 1, wherein the credential is one of an authorization token, a cookie, and a username/password combination.

15. A computer-implemented method for automatically generating an account credential for accessing a cloud-based service located on a cloud-based service provider server, the method comprising:

receiving, in a browser, a Uniform Resource Identifier (URI) for the cloud-based service;

transmitting, to the cloud-based service provider server, a request to send a document identified by the URI;

receiving, from the cloud-based service provider server, the document identified by the URI, wherein the document includes a fillable form for establishing an account for accessing the cloud-based service, the fillable form including a request for an account credential;

transmitting, to a cloud-based credential server, a request to auto-generate the account credential, the request to auto-generate the account credntial including the URI for the cloud-based service and the cloud-based credential server being operationally separate from the cloud-based service provider server;

receiving, from the cloud-based credential server, the auto-generated account credential; and transmitting, to the cloud-based service provider server, a request to generate a user account, the request to generate the user account including the auto-generated account credential.

16. The computer-implemented method of claim 15, wherein the auto-generated account credential includes a credential selected from the group consisting of: a username and a password.

17. The computer-implemented method of claim 15, wherein the auto-generated account credential is one of an authorization token, a cookie, and a username/password combination.

18. The computer-implemented method of claim 15, wherein auto-generating the account credential comprises randomly generating a username/password pair for accessing a second cloud-based service.

19. The computer-implemented method of claim 18, wherein randomly generating the username/password pair comprises randomly generating the username/password pair in accordance with criteria provided to the computing device from the second cloud-based service.

* * * * *

UNITED STATES PATENT AND TRADEMARK OFFICE
CERTIFICATE OF CORRECTION

| | | |
|---|---|---|
| PATENT NO. | : 8,544,072 B1 | Page 1 of 1 |
| APPLICATION NO. | : 12/828026 | |
| DATED | : September 24, 2013 | |
| INVENTOR(S) | : Christopher Masone et al. | |

It is certified that error appears in the above-identified patent and that said Letters Patent is hereby corrected as shown below:

On the Title page, item (54) and in the Specification, in column 1, line 1, under "Title", delete "SINGLE SIGN-ON SERVICE" and insert -- SINGLE-SIGN-ON SERVICE --, therefor.

In the Claims:

In column 19, line 26, in claim 15, delete "credintial" and insert -- credential --, therefor.

Signed and Sealed this
Eleventh Day of February, 2014

Michelle K. Lee
*Deputy Director of the United States Patent and Trademark Office*